(12) United States Patent
Zhu et al.

(10) Patent No.: US 11,244,232 B2
(45) Date of Patent: Feb. 8, 2022

(54) FEATURE RELATIONSHIP RECOMMENDATION METHOD, APPARATUS, COMPUTING DEVICE, AND STORAGE MEDIUM

(71) Applicant: Advanced New Technologies Co., Ltd., Grand Cayman (KY)

(72) Inventors: Liang Zhu, Hangzhou (CN); Wenlong Zhao, Hangzhou (CN); Junhu Xu, Hangzhou (CN); Qingyue Zhou, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/084,436

(22) Filed: Oct. 29, 2020

(65) Prior Publication Data

US 2021/0049478 A1 Feb. 18, 2021

Related U.S. Application Data

(63) Continuation of application No. PCT/CN2019/092738, filed on Jun. 25, 2019.

(30) Foreign Application Priority Data

Aug. 22, 2018 (CN) .......................... 201810959354.7

(51) Int. Cl.
*G06N 5/02* (2006.01)
*G06K 9/62* (2006.01)
(Continued)

(52) U.S. Cl.
CPC .......... *G06N 5/025* (2013.01); *G06K 9/6201* (2013.01); *G06K 9/623* (2013.01); *G06K 9/6232* (2013.01);
(Continued)

(58) Field of Classification Search
CPC .......... G06N 5/025; G06N 3/08; G06N 20/00; G06N 5/047; G06N 5/003; G06N 5/022;
(Continued)

(56) References Cited

U.S. PATENT DOCUMENTS

| 2011/0099139 A1* | 4/2011 | Coldicott ............... G06Q 10/06 706/47 |
| 2016/0189028 A1* | 6/2016 | Hu .......................... G06N 5/02 706/46 |

(Continued)

FOREIGN PATENT DOCUMENTS

| CN | 103699663 | 4/2014 |
| CN | 104462501 | 3/2015 |

(Continued)

OTHER PUBLICATIONS

Knowledge Base Completion via Coupled Path Ranking Wang et al. (Year: 2016).*

(Continued)

*Primary Examiner* — Kakali Chaki
*Assistant Examiner* — Ababacar Seck
(74) *Attorney, Agent, or Firm* — Fish & Richardson P.C.

(57) ABSTRACT

Disclosed herein are methods, systems, and apparatus, including computer programs encoded on computer storage media, for generating relationship recommendations. One of the methods includes: determining, by a computing device, parameter entities that comprise event entities associated with node entities; constructing, by the computing device, a knowledge graph based on relationships between the parameter entities and predetermined operator entities; extracting, by the computing device, a newly added relationship from the knowledge graph based on an inference rule; and providing, by the computing device, a relationship recommendation corresponding to the newly added relationship.

18 Claims, 6 Drawing Sheets

(51) Int. Cl.
*G06N 3/08* (2006.01)
*G06N 5/00* (2006.01)
*G06N 5/04* (2006.01)
*G06N 20/00* (2019.01)

(52) U.S. Cl.
CPC ......... *G06K 9/6256* (2013.01); *G06K 9/6296* (2013.01); *G06N 3/08* (2013.01); *G06N 5/003* (2013.01); *G06N 5/047* (2013.01); *G06N 20/00* (2019.01)

(58) Field of Classification Search
CPC .. G06K 9/6256; G06K 9/6296; G06K 9/6232; G06K 9/623; G06K 9/6201; G06K 9/6267; G06F 16/906
See application file for complete search history.

(56) References Cited

U.S. PATENT DOCUMENTS

| | | | |
|---|---|---|---|
| 2017/0097984 A1* | 4/2017 | Haidar | G06F 16/288 |
| 2017/0098013 A1* | 4/2017 | Shirwadkar | G06F 16/36 |
| 2017/0185908 A1 | 6/2017 | Yang et al. | |
| 2018/0082183 A1* | 3/2018 | Hertz | G06F 16/36 |
| 2018/0253755 A1* | 9/2018 | Cheng | G06K 9/6259 |
| 2019/0034766 A1* | 1/2019 | Chen | G06N 5/003 |
| 2019/0050368 A1* | 2/2019 | Chen | G06N 20/10 |
| 2019/0172075 A1* | 6/2019 | Kenkre | G06Q 50/01 |
| 2019/0197429 A1* | 6/2019 | Yin | G06N 20/00 |
| 2019/0228320 A1* | 7/2019 | Feng | G06N 20/00 |
| 2019/0279111 A1* | 9/2019 | Merrill | G06N 20/20 |
| 2020/0201875 A1* | 6/2020 | Wu | G06F 16/254 |

FOREIGN PATENT DOCUMENTS

| | | |
|---|---|---|
| CN | 106815369 | 6/2017 |
| CN | 106934042 | 7/2017 |
| CN | 107016072 | 8/2017 |
| CN | 107665252 | 2/2018 |
| CN | 107748754 | 3/2018 |
| CN | 108109063 | 6/2018 |
| CN | 108154198 | 6/2018 |
| CN | 108287881 | 7/2018 |
| CN | 108334528 | 7/2018 |
| CN | 109189937 | 1/2019 |
| TW | 201626293 | 7/2016 |

OTHER PUBLICATIONS

Cbdio.com [online], "Inference Based on Large-Scale Knowledge Map," Aug. 30, 2016, retrieved on Nov. 3, 2020, retrieved from URL<http://www.cbdio.com/BigData/2016-08/30/content_5224578.htm>, 50 pages (with machine translation).

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2019/092738, dated Sep. 29, 2019, 11 pages (with partial translation).

Qi et al. "The Research Advances of Knowledge Graph," Information Engineering, Jan. 2017, 3(1):4-25 (with English translation).

Extended European Search Report in European Application No. 19852264.1, dated Jul. 12, 2021, 10 pages.

Liu et al., "Knowledge Graph Construction Techniques," Journal of Computer Research and Development, Mar. 2016, 53(3):582-600 (with English abstract).

Zhan et al., "A Loan Application Fraud Detection Method Based on Knowledge Graph and Neural Network," Proceedings of the 2nd International Conference on Innovation in Artificial Intelligence, Mar. 12, 2019, pp. 111-115.

* cited by examiner

FEATURE RELATIONSHIP RECOMMENDATION METHOD, APPARATUS, COMPUTING DEVICE, AND STORAGE MEDIUM

CROSS-REFERENCE TO RELATED APPLICATIONS

This application is a continuation of PCT Application No. PCT/CN2019/092738, filed on Jun. 25, 2019, which claims priority to Chinese Patent Application No. 201810959354.7, filed on Aug. 22, 2018, and each application is hereby incorporated by reference in its entirety.

TECHNICAL FIELD

The present specification relates to the field of computer security technologies, and in particular, to feature relationship recommendation methods, apparatuses, computing devices, and storage media.

BACKGROUND

As ALIPAY services develop, a security environment of ALIPAY is constantly changing, and manually generating a feature relationship in conventional technologies becomes inefficient.

Currently, in the existing technologies, the feature relationship is usually recommended by using the following methods: manual search, selection, and determining, but this solution depends on manpower, and brute-force search consumes too many resources.

A heuristic search algorithm is used to perform search, and then selection is performed by using a certain evaluation model. However, in the solution, service knowledge is not introduced, search space is still large, and it is difficult to find a valid feature relationship.

SUMMARY

In view of this, embodiments of the present specification provide feature relationship recommendation methods, apparatuses, computing devices, and storage media, to alleviate a technical problem in the existing technology.

Some embodiments of the present specification disclose a feature relationship recommendation method, where the method includes: determining parameter instances based on service data, where the parameter instances include event entities and node entities, and the node entities are associated by using the event entities; constructing a knowledge graph based on feature relationships between the parameter instances and predetermined operator entities; and extracting a feature relationship from the knowledge graph based on an inference rule, to obtain a newly added feature relationship and recommend the newly added feature relationship.

According to another aspect, some embodiments of the present specification disclose a feature relationship recommendation apparatus, where the apparatus includes: a determining module, configured to determine parameter instances based on service data, where the parameter instances include event entities and node entities, and the node entities are associated by using the event entities; a construction module, configured to construct a knowledge graph based on feature relationships between the parameter instances and predetermined operator entities; and an extraction module, configured to extract a feature relationship from the knowledge graph based on an inference rule, to obtain a newly added feature relationship and recommend the newly added feature relationship.

According to another aspect, the present specification further provides a computing device, including a memory, a processor, and computer instructions that are stored in the memory and that can run on the processor, where when executing the instructions, the processor implements step of the feature relationship recommendation method.

According to another aspect, the present specification further provides a computer readable storage medium, where the computer readable storage medium stores computer instructions, and steps of the feature relationship recommendation method are implemented when the program is executed by a processor.

The present specification provides feature relationship recommendation methods, apparatuses, computing devices, and storage media. The method includes: determining parameter instances based on service data, where the parameter instances include event entities and node entities, and the node entities are associated by using the event entities; constructing a knowledge graph based on feature relationships between the parameter instances and predetermined operator entities; and extracting a feature relationship from the knowledge graph based on an inference rule, to obtain a newly added feature relationship and recommend the newly added feature relationship.

DESCRIPTION OF EMBODIMENTS

Many specific details are described in the following descriptions to facilitate full understanding of the present specification. However, the present specification can be implemented by using many different methods from those described here. A person skilled in the art can perform similar promotion without departing from the intension of the present specification. Therefore, the present specification is not limited to the specific embodiment disclosed below.

Terms used in some embodiments of the present specification are only used to describe specific embodiments, and are not intended to limit the some embodiments of the present specification. The terms "a" and "the" of singular forms used in some embodiments of the present specification and the appended claims are also intended to include plural forms, unless otherwise specified in the context clearly. It should be further understood that the term "and/or" used in some embodiments of the present specification indicates and includes any or all possible combinations of one or more associated listed items.

It should be understood that although terms "first", "second", "third", etc. may be used in some embodiments of the present specification to describe various types of information, the information is not limited to these terms. These terms are only used to distinguish between information of the same type. For example, without departing from the scope of some embodiments of the present specification, first can also be referred to as second, and similarly, second can be referred to as first. Depending on the context, for example, the word "if" used here can be explained as "while", "when", or "in response to determining".

First, technical terms used in some embodiments of the present specification are explained.

A knowledge graph/vault is also referred to as a scientific knowledge graph, is a knowledge cluster organized in a form of a graph in knowledge engineering, and is formed by using different types of entities as nodes and relationships as edges that connect the nodes.

Knowledge inference is to supplement and discover new knowledge through certain logical inference based on existing knowledge in the knowledge graph.

In some embodiments of the present specification, feature relationship recommendation methods, apparatuses, computing devices, and computer storage media are provided. Details are described one by one in the following embodiments.

Figure 1:
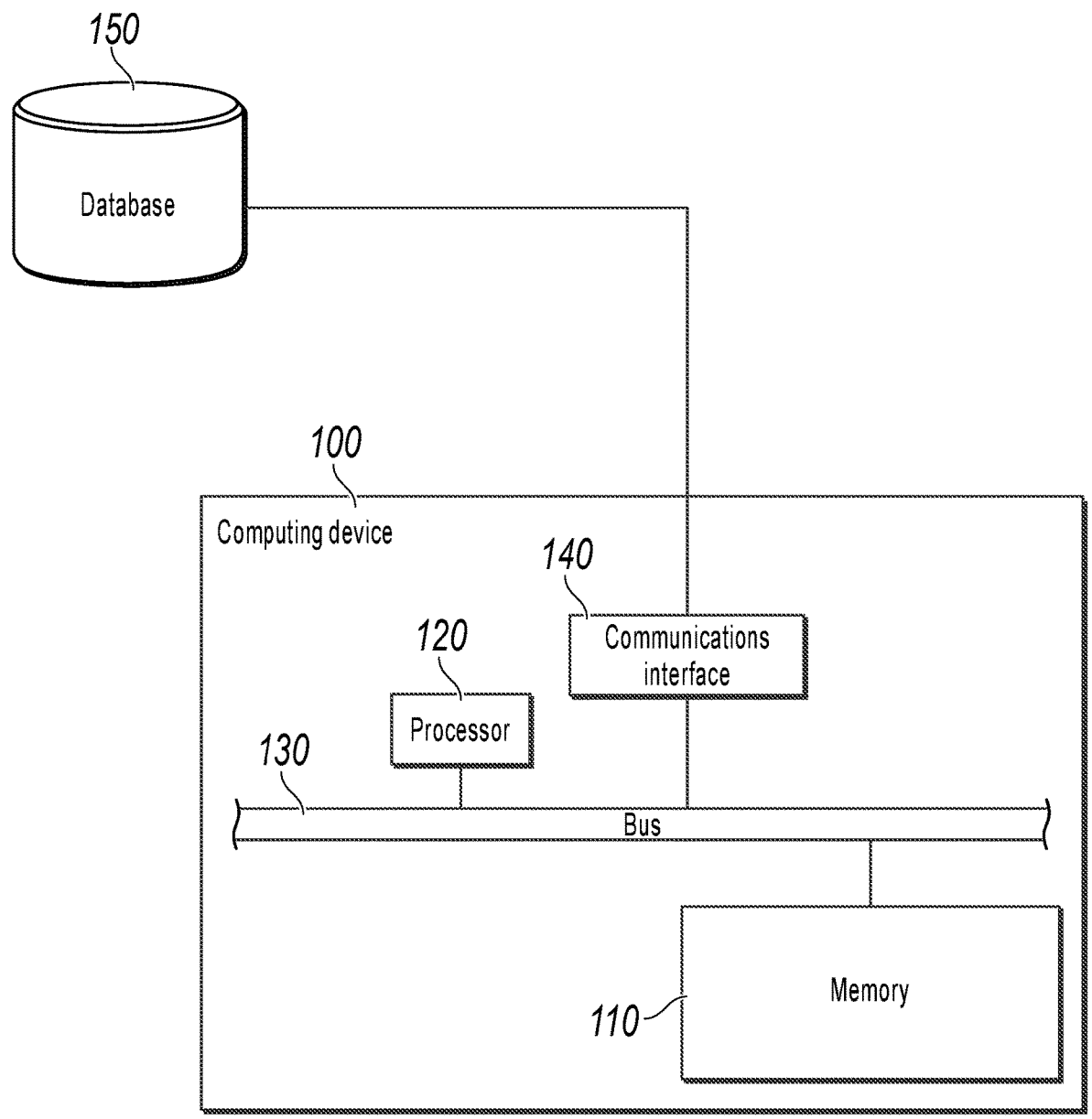
FIG. 1 is a structural block diagram illustrating a computing device, according to some embodiments of the present specification.

FIG. 1 is a structural block diagram of a computing device 100, according to some embodiments of the present specification. Components of the computing device 100 include but are not limited to a memory 110, a processor 120, and a communications interface 140. The processor 120 is connected to the memory 110 by using a bus 130, and a database 150 is configured to store log data of an access request.

The communications interface 140 enables the computing device 100 to perform communication through one or more networks. Examples of these networks include a local area network (LAN), a wide area network (WAN), a personal area network (PAN), or a combination of communications networks such as the Internet. A network interface can include one or more of any type of wired or wireless network interface (for example, a network interface card (NIC)), for example, an IEEE 802.11 wireless local area network (WLAN) wireless interface, a Worldwide Interoperability for Microwave Access (WiMAX) interface, an Ethernet interface, a Universal Serial Bus (USB) interface, a cellular network interface, a Bluetooth interface, or a Near Field Communication (NFC) interface.

The memory 110 is configured to store service data sent by the communications interface 140 by using the bus 130 and computer instructions that are stored in the memory 110 and that can run on the processor 120.

The processor 120 is configured to: after the service data stored in the memory 110 is obtained, execute the computer instructions stored in the memory 110, to verify the to-be-identified object.

The computing device 100 can be any type of fixed or mobile computing device, including a mobile computer or mobile computing device (for example, a tablet computer, a personal digital assistant, a laptop computer, a notebook computer, or a netbook), a mobile phone (for example, a smartphone), a wearable computing device (for example, a smart watch or smart glasses) or another type of mobile device, or a fixed computing device such as a desktop computer or a PC.

Figure 2:
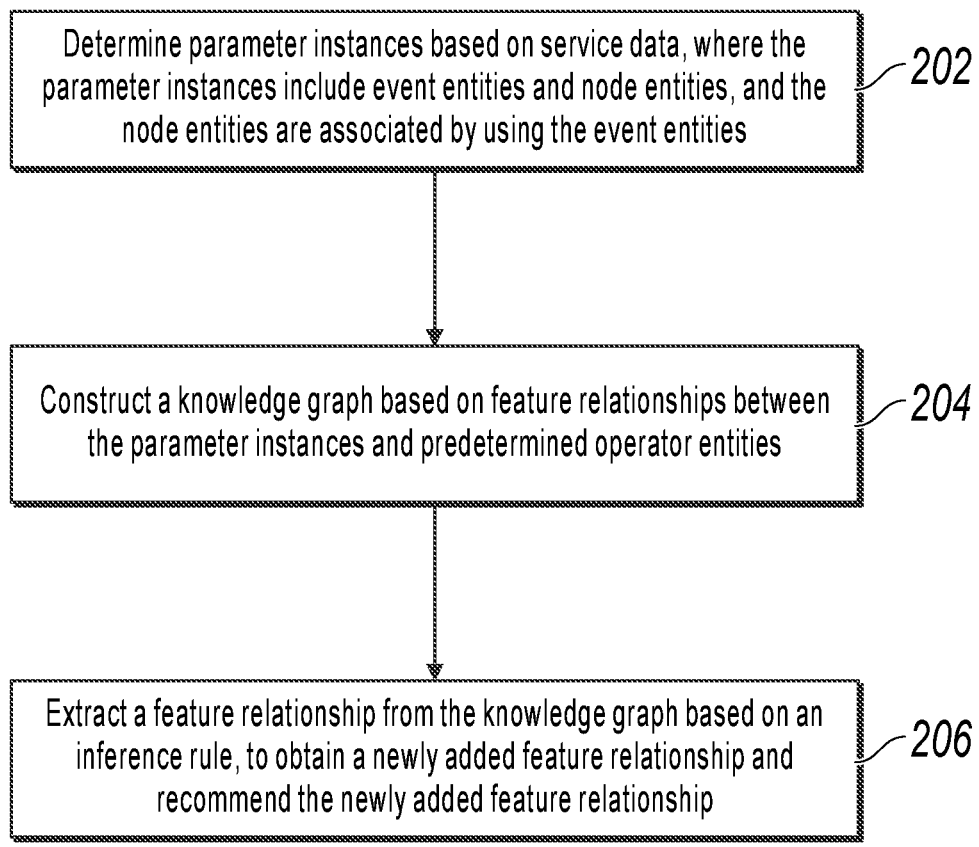
FIG. 2 is a flowchart illustrating a feature relationship recommendation method, according to some embodiments of the present specification.

The processor 120 can perform steps in the method shown in FIG. 2. FIG. 2 is a schematic flowchart illustrating a feature relationship recommendation method, according to some embodiments of the present specification. The method includes step 202 to step 206.

Step 202: Determine parameter instances based on service data, where the parameter instances include event entities and node entities, and the node entities are associated by using the event entities.

In some embodiments of the present specification, the service data includes but is not limited to transaction data, login data, transfer data, etc.

The parameter instances are determined based on primary parameters in the service data. The primary parameters are concepts, and the corresponding parameter instances are instances of specific concepts.

Figure 3:
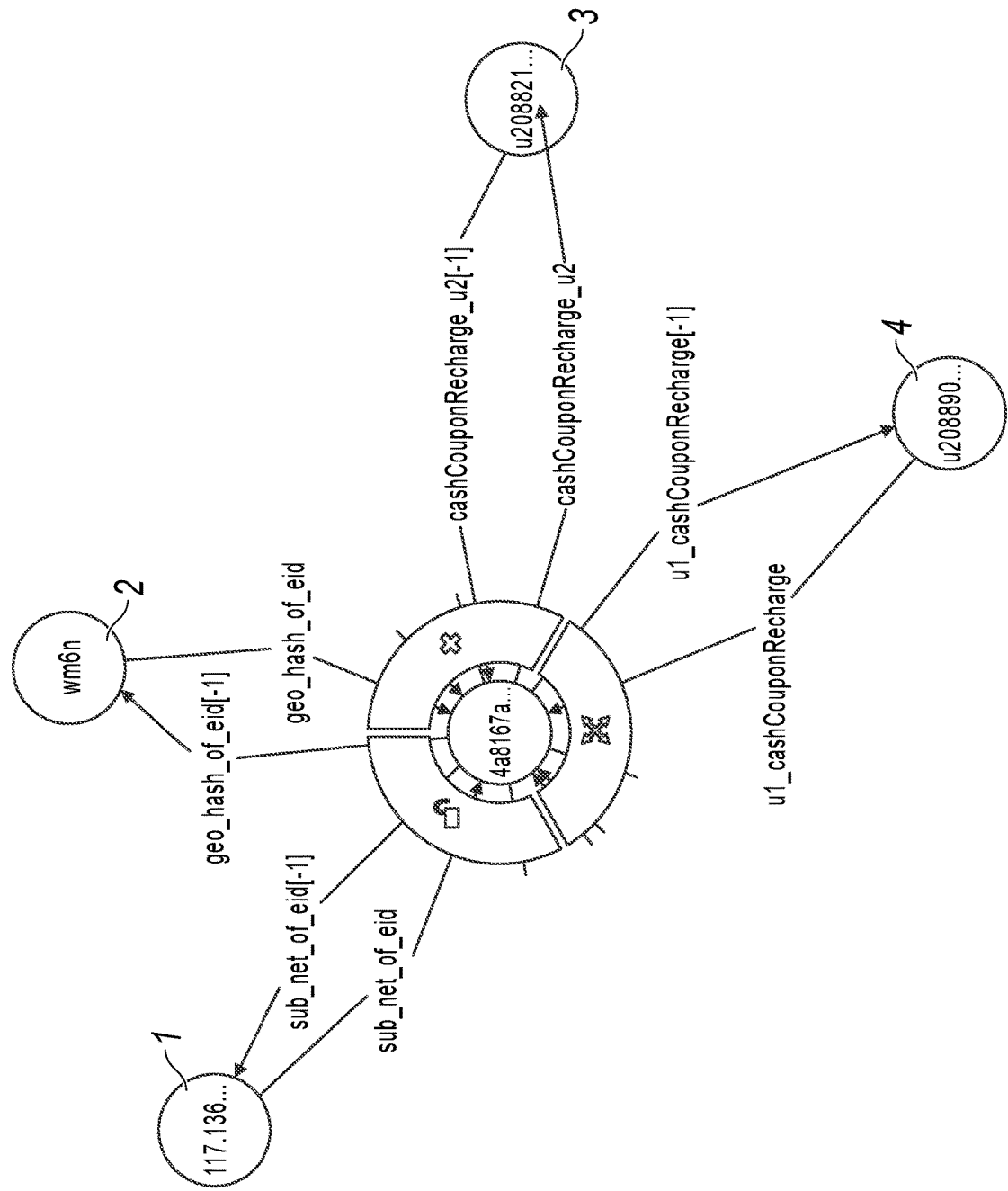
FIG. 3 is a schematic diagram illustrating a parameter instance, according to some embodiments of the present specification.

For example, referring to FIG. 3, the primary parameters include entity parameters: an event, an account, a device, and a location. In a specific application scenario, the corresponding parameter instances are instances of specific parameters: An intermediate entity is a certain ALIPAY event eventID: 4a8167a***, entity 3 and entity 4 each are a certain ALIPAY account ID: 208821* and 208890*, entity 2 is a geohash value of location service information of a certain mobile phone device: wm6n, and entity 1 is an IP address of a certain mobile phone device: 117.136..**.

In practice, the parameter instances include but are not limited to specific entities such as events, accounts, identity cards, devices, mobile phone numbers, location based services (LBS), and IP addresses.

The node entities include but are not limited to device entities, account entities, and/or transaction entities.

In some embodiments of the present specification, the parameter instances include node entities and event entities, and the node entities are associated by using the event entities. For example, the node entities include account 1 and account 2, and the event entity is transferring 3 yuan. In this case, the node entities can be associated by using the event entities, to represent transferring 3 yuan from account 1 to account 2. In actual use, the association can represent a relationship such as ALIPAY event transaction or login.

Step 204: Construct a knowledge graph based on feature relationships between the parameter instances and predetermined operator entities.

In some embodiments of the present specification, the predetermined operator entities can be obtained by using an existing feature. For example, if the existing feature includes "a maximum moving speed of an ALIPAY account ID in a certain time period", a corresponding operator entity includes a gradient operator. If the existing feature includes "historical location dispersion of a certain ALIPAY mobile phone", a corresponding operator entity includes an entropy operator. If the existing feature includes "an accumulated red envelope amount within 3 days of a certain ALIPAY account", a corresponding operator entity includes a sum operator.

In practice, operators in the feature are first classified based on the existing feature, and different types of operators are named as different operator entities, for example, a velocity operator, a sequence operator, and a topology operator. After the different operator entities are specifically instantiated, operator entities corresponding to the operator entities are obtained, for example, a sum operator, an entropy operator, and a gradient operator.

The knowledge graph is constructed based on the feature relationships between the parameter instances and the predetermined operator entities. The operator entity can complete basic query, annotation, calculation, inference, and prediction based on the knowledge graph.

Step 206: Extract a feature relationship from the knowledge graph based on an inference rule, to obtain a newly added feature relationship and recommend the newly added feature relationship.

In some embodiments of the present specification, the inference rule includes a path ranking algorithm, and a new feature relationship is extracted based on the knowledge graph by using the path ranking algorithm, to obtain a newly added feature relationship and recommend the newly added feature relationship.

Figure 4:
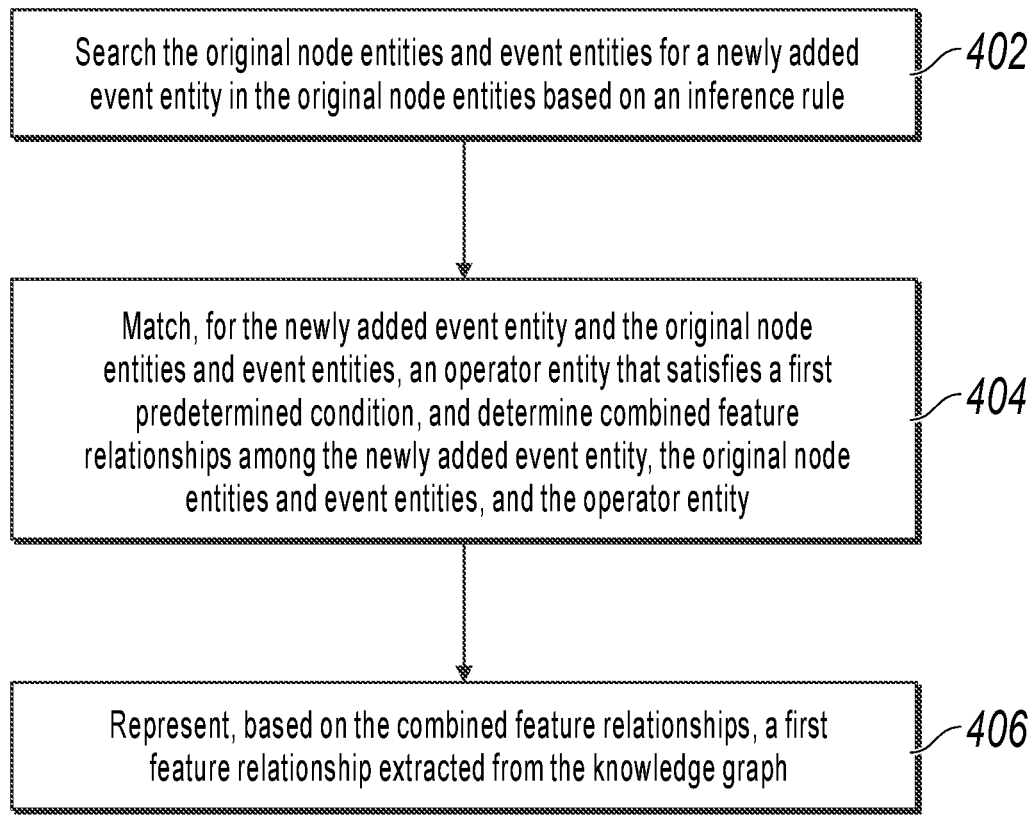
FIG. 4 is a flowchart illustrating a feature relationship recommendation method, according to some embodiments of the present specification.

Referring to FIG. 4, extracting a feature relationship from the knowledge graph based on an inference rule includes step 402 to step 406.

Step 402: Search the original node entities and event entities for a newly added event entity in the original node entities based on the inference rule.

Figure 5:
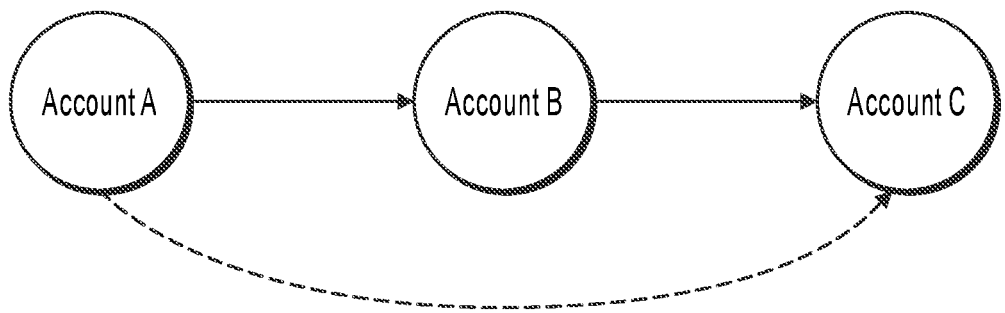
FIG. 5 is a flowchart illustrating a feature relationship recommendation method, according to some embodiments of the present specification.

Referring to FIG. 5, in some embodiments of the present specification, for example, the node entities include account A, account B, and account C, and the event entity includes transferring 3 yuan. The three node entities are associated by using the event entities as follows: Account A transfers 3 yuan to account B, and account B transfers 3 yuan to account C. Based on the path ranking algorithm, the newly added event entity in the original node entities can be obtained: Account A transfers 3 yuan to account C.

Step 404: Match, for the newly added event entity and the original node entities and event entities, an operator entity that satisfies a first predetermined condition, and determine combined feature relationships among the newly added event entity, the original node entities and event entities, and the operator entity.

In some embodiments of the present specification, the first predetermined condition includes but is not limited to an actual need feature. FIG. 5 is used as an example. If the first predetermined condition includes "an accumulated quantity of transfer times of account A in two days", the matched operator entity is a sum operator.

For example, the newly added event entity includes transferring 3 yuan from account A to account C, association between the original node entities and the event entities includes: transferring 3 yuan from account A to account B, transferring 3 yuan from account B to account C, and transferring 1 yuan from account A to account D, and the operator entity includes a sum operator. The combined feature relationships among the newly added event entity, and the original node entities and event entities, and the operator entity are determined, and the combined feature relationships include "an accumulated quantity of transfer times of account A", "an accumulated transfer amount of account A", etc.

Step 406: Represent, based on the combined feature relationships, a first feature relationship extracted from the knowledge graph.

In some embodiments of the present specification, the first feature relationship is a combined feature relationship.

In actual use, the relationships between the node entities and the event entities are first supplemented by using the inference rule to determine, through inference, which node entities can form an abstract key-collection relationship. Then, an operator entity that satisfies the condition is matched based on the key-collection relationship and the relationships between the original node entities and the event entities, to determine the combined feature relationships.

For example, the node entities include an identity card, a card number, a mobile phone number, an ALIPAY account, an IP address, a mobile phone device number, etc. Then, the node entity is used as a key, and statistics about other event entities and node entities including a transaction amount, a login lbs location, a transaction time, a login city, an identity card, a card number, a mobile phone number, etc. are collected as a group, to collect statistics about a key-collection relationship between the identity card as the key and each of the transaction amount, the login lbs location, the transaction time, the login city, another identity card, the card number, the mobile phone number, etc., and a key-collection relationship between the card number as the key and each of the transaction amount, the login lbs location, the transaction time, the login city, the identity card, another card number, the mobile phone number, etc.

After the key-collection relationship is obtained, a feature relationship can be formed by cooperating with the operator entity. An ALIPAY account is used as the key. All identity cards that appear in the account are grouped, and a combined feature relationship "a quantity of identity cards obtained in a certain ALIPAY account after removing duplications" can be formed by combining with a count operator. An identity card number is used as the key. Transaction amounts of the identity card are grouped, and a combined feature relationship "an accumulated consumption amount of a certain ALIPAY account" can be formed by combining with a sum operator. A mobile phone device account is used as the key. Lbs of the mobile phone device account are grouped, and a combined feature relationship "a maximum moving distance of the mobile phone device" is formed by combining with a maxDistance operator.

In some embodiments of the present specification, the apparatus is further subject to a second predetermined condition, and the apparatus further performs: filtering the combined feature relationships based on the second predetermined condition; and representing, based on the filtered combined feature relationships, a second feature relationship extracted from the knowledge graph.

In some embodiments of the present specification, the second predetermined condition includes but is not limited to a node entity in the knowledge graph that is newly added to the combined feature relationships.

For example, the combined feature relationships include "a maximum moving distance of the mobile phone device", and the second predetermined condition includes a newly added node entity "time window three days" in the knowledge graph. In this case, a combined feature relationship "a maximum moving distance of the mobile phone device within three days" can be obtained, and the combined feature relationship is the second feature relationship.

In actual use, different relationship paths are used as one-dimensional features in the path ranking algorithm, and feature vectors of relationship classification are constructed by collecting statistics about a large quantity of relationship paths in the knowledge graph, to establish a relationship classifier to extract a new feature relationship.

In some embodiments of the present specification, the inference rule is implemented in a form of a Horn clause under a first-order logical inference framework, and can be written based on knowledge, or can be obtained through learning by using a machine learning method based on data. For example, the rule is implemented through learning and training of an artificial neural network, parameter instances, operator entities, and relationships between the parameter instances and the operator entities are input by using the inference rule, and the extracted new feature relationship is output, to recommend the newly added feature relationship.

In some embodiments of the present specification, based on the method, the service data is implemented in the knowledge graph by using the parameter instances, the operator entity, and the feature relationships between the parameter instances and the operator entity, and searching of the new feature relationship is instructed and restricted based on the original feature relationship by using the inference rule, thereby alleviating searching for and recommending a large quantity of meaningless feature relationships.

Figure 6:
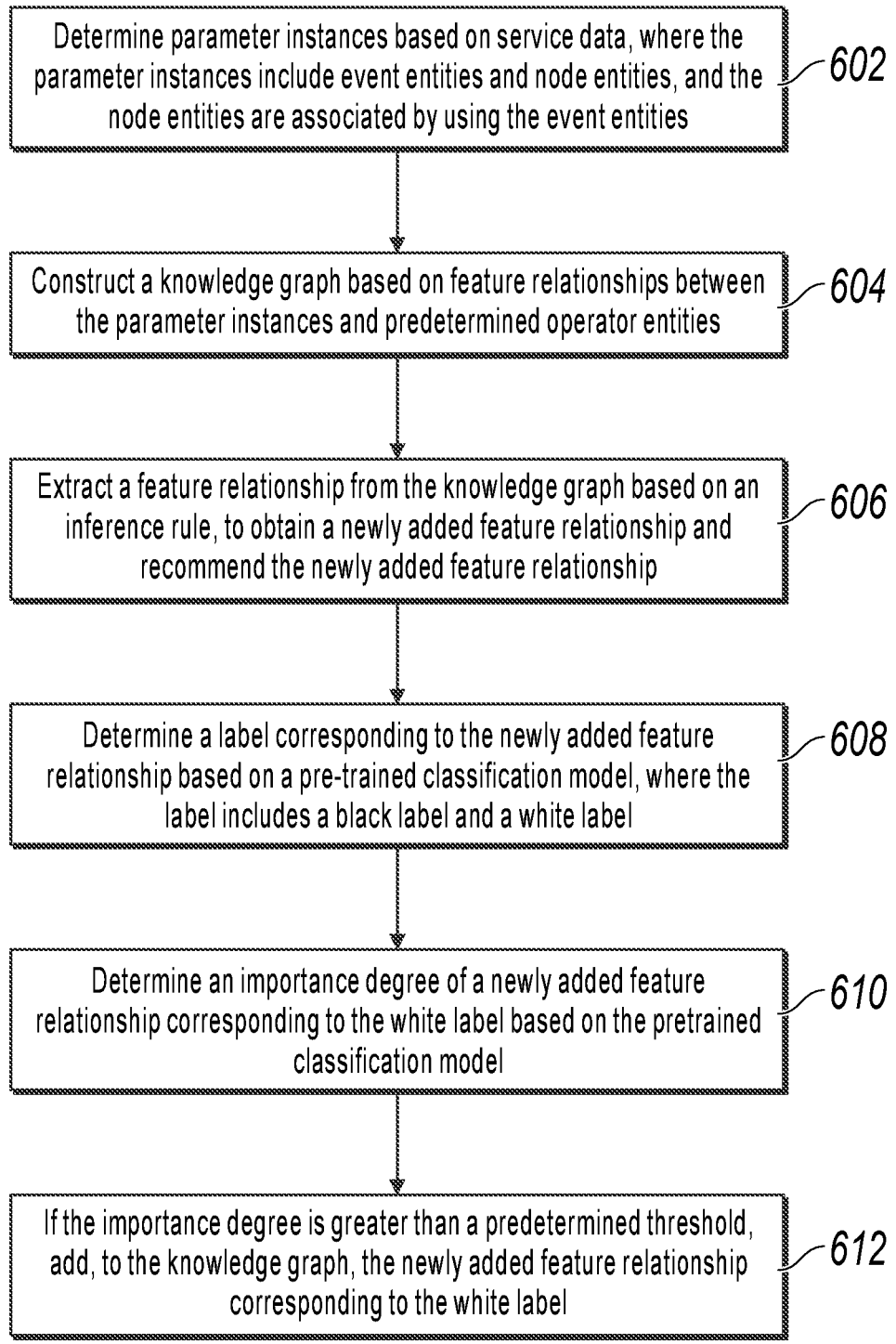
FIG. 6 is a flowchart illustrating a feature relationship recommendation method, according to some embodiments of the present specification.

FIG. 6 is a schematic flowchart illustrating a feature relationship recommendation method, according to some embodiments of the present specification. The method includes step 602 to step 612.

Step 602: Determine a parameter instances based on service data, where the parameter instances include event entities and node entities, and the node entities are associated by using the event entities.

Step 604: Construct a knowledge graph based on feature relationships between the parameter instances and predetermined operator entities.

Step 606: Extract a feature relationship from the knowledge graph based on an inference rule, to obtain a newly added feature relationship and recommend the newly added feature relationship.

Step 608: Determine a label corresponding to the newly added feature relationship based on a pre-trained classification model, where the label includes a black label and a white label.

In some embodiments of the present specification, pre-training the classification model includes the following steps: obtaining a training sample data set, where the training sample data set includes a feature relationship sample between a parameter instance sample and an operator entity sample and a sample label corresponding to the feature relationship sample, and the sample label includes a white sample label and a black sample label; and training the classification model based on a tree-type model, where the classification model associates the feature relationship sample with the sample label.

In some embodiments of the present specification, an importance degree of each feature relationship sample corresponding to the white sample label is obtained by using the classification model.

In some embodiments of the present specification, the tree-type model includes an XGBoost model.

In some embodiments of the present specification, if the classification model is applied to anti-fraud in the financial industry, the white label can be a label without a fraud risk, and the black label can be a label with a fraud risk.

Determining a label corresponding to the newly added feature relationship based on a pre-trained classification model includes: determining, based on the pre-trained classification model, which newly added feature relationship is a white label without a fraud risk, and which newly added feature relationship is a black label with a fraud risk.

Step 610: Determine an importance degree of a newly added feature relationship corresponding to the white label based on the pre-trained classification model.

In some embodiments of the present specification, after the label corresponding to the newly added feature relationship is determined, the importance degree of the newly added feature relationship corresponding to the white label is determined. An importance degree of a newly added feature relationship corresponding to the black label does not need to be obtained, to reduce workload and improve working efficiency of the classification model.

Step 612: If the importance degree is greater than a predetermined threshold, add, to the knowledge graph, the newly added feature relationship corresponding to the white label.

In some embodiments of the present specification, the predetermined threshold can be set based on actual applications, and can be set to 80%, 95%, or 100%. Embodiments are not limited in the present specification.

If the predetermined threshold is 80%, an importance degree of a newly added feature relationship corresponding to a certain white label is 85%, and the importance degree of the newly added feature relationship is greater than the predetermined threshold, the newly added feature relationship is added to the knowledge graph.

In some embodiments of the present specification, for example, if the newly added feature relationship is "a maximum moving speed of an ALIPAY account within 6 hours", the feature is input into the XGBoost model, it is evaluated that an importance degree of the feature is 89%, and the predetermined threshold is 85%, a feature relationship among "an ALIPAY account entity", "an lbs entity", and "a gradient operator entity" is constructed in the knowledge graph.

In some embodiments of the present specification, based on the method, newly added feature relationships are classified and the importance degree of the newly added feature relationship corresponding to the white label is evaluated based on the classification model, and a newly added feature relationship whose importance degree reaches a specified requirement is added to the constructed knowledge graph, to enrich the knowledge graph, thereby improving extension performance of the knowledge graph.

Figure 7:
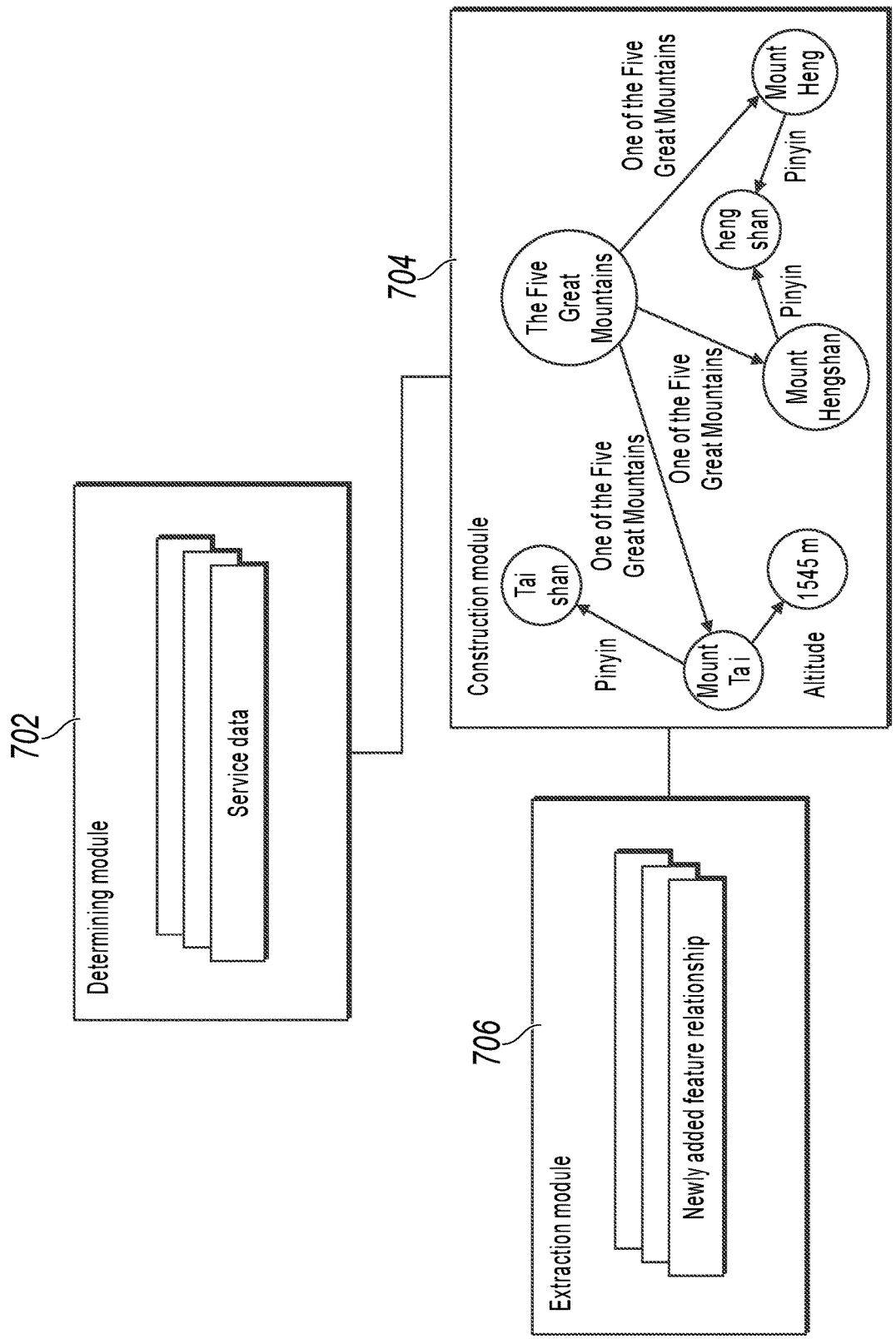
FIG. 7 is a schematic structural diagram illustrating a feature relationship recommendation apparatus, according to some embodiments of the present specification.

Referring to FIG. 7, some embodiments of the present specification provide a feature relationship recommendation apparatus, including: a determining module 702, configured to determine parameter instances based on service data, where the parameter instances include event entities and node entities, and the node entities are associated by using the event entities; a construction module 704, configured to construct a knowledge graph based on feature relationships between the parameter instances and predetermined operator entities; and an extraction module 706, configured to extract a feature relationship from the knowledge graph based on an inference rule, to obtain a newly added feature relationship and recommend the newly added feature relationship.

Optionally, the apparatus further includes: a label selection module, configured to determine a label corresponding to the newly added feature relationship based on a pre-trained classification model, where the label includes a black label and a white label.

Optionally, the apparatus further includes: an importance degree determining module, configured to determine an importance degree of a newly added feature relationship corresponding to the white label based on the pre-trained classification model; and an addition module, configured to: if the importance degree is greater than a predetermined threshold, add, to the knowledge graph, the newly added feature relationship corresponding to the white label.

Optionally, the classification model is trained by using the following steps: obtaining a training sample data set, where the training sample data set includes a feature relationship sample between a parameter instance sample and an operator entity sample and a sample label corresponding to the feature relationship sample, and the sample label includes a white sample label and a black sample label; and training the classification model based on a tree-type model, where the classification model associates the feature relationship sample with the sample label.

Optionally, the apparatus further includes: an acquisition module, configured to obtain an importance degree of each feature relationship sample corresponding to the white sample label by using the classification model.

Optionally, the extraction module includes: an addition submodule, configured to search the original node entities and event entities for a newly added event entity in the original node entities based on the inference rule; and a combined feature relationship determining submodule, configured to: match, for the newly added event entity and the original node entities and event entities, an operator entity that satisfies a first predetermined condition, and determine combined feature relationships among the newly added event entity, the original node entities and event entities, and the operator entity; and a feature relationship extraction submodule, configured to represent, based on the combined feature relationships, a first feature relationship extracted from the knowledge graph.

Optionally, the apparatus is further subject to a second predetermined condition, and the apparatus further performs: filtering the combined feature relationships based on the second predetermined condition; and representing, based on the filtered combined feature relationships, a second feature relationship extracted from the knowledge graph.

Optionally, the tree-type model includes an XGBoost model.

Optionally, the inference rule includes a path ranking algorithm.

Optionally, the operator entity includes a sum operator, an entropy operator, or a gradient operator.

In some embodiments of the present specification, based on the apparatus, the service data is implemented in the knowledge graph by using the parameter instances, the operator entity, and the feature relationships between the parameter instances and the operator entity, and searching of the new feature relationship is instructed and restricted based on the original feature relationship by using the inference rule, thereby alleviating searching for and recommending a large quantity of meaningless feature relationships.

The embodiments in some embodiments of the present specification are described by using a progressive method. For the same or similar parts in the embodiments, references can be made to each other. Each embodiment focuses on a difference from other embodiments. Particularly, an apparatus embodiment is similar to a method embodiment, and therefore is described briefly. For a related part, references can be made to some descriptions in the method embodiment.

Some embodiments of the present specification further provide a computer readable storage medium, where the computer readable storage medium stores computer instructions, and when the instructions are executed by a processor, steps of the feature relationship recommendation method are implemented.

The previous descriptions are schematic solutions of the computer readable storage medium in this embodiment. It is worthwhile to note that the technical solutions of the storage medium and the technical solutions of the previous feature relationship recommendation method belong to a same concept. For details that are not described in detail in the technical solutions of the storage medium, references can be made to descriptions of the technical solutions of the previous feature relationship recommendation method.

Specific embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some embodiments, multi-tasking and concurrent processing is feasible or may be advantageous.

Technical carriers related to payment in the embodiments of the present specification can include, for example, Near Field Communication (NFC), Wireless Fidelity (Wi-Fi), 3G/4G/5G, a technology of swiping card by using a point of sale (POS) machine, a quick response code scanning technology, a bar code scanning technology, Bluetooth, infrared, a short message service (SMS), and a multimedia messaging service (MMS).

The computer instructions include computer instruction code, and the computer instruction code can be in a source code form, an object code form, an executable file, some intermediate forms, etc. The computer readable medium can include any entity or apparatus that can include the computer instruction code, a recording medium, a USB flash drive, a removable hard disk, a magnetic disk, an optical disc, a computer memory, a read-only memory (ROM), a random access memory (RAM), an electrical carrier signal, a telecommunication signal, a software distribution medium, etc. It is worthwhile to note that content included in the computer readable medium can be appropriately increased or decreased based on a need of legislation and patent practice in a jurisdiction. For example, in some jurisdictions, based on legislation and patent practice, the computer readable medium does not include an electrical carrier signal and a telecommunication signal.

It is worthwhile to note that, for brief description, the previous method embodiments are expressed as a combination of a series of actions. However, a person skilled in the art should appreciate that the present specification is not limited to the described action sequence because some steps can be performed in other sequences or performed simultaneously according to the present specification. In addition, a person skilled in the art should also appreciate that all the embodiments described in the present specification are examples of embodiments, and the mentioned actions and modules are not necessarily mandatory to the present specification.

In the previous embodiments, the description of each embodiment has respective focuses. For a part not described in detail in some embodiments, references can be made to related descriptions in other embodiments.

The embodiments of the present specification disclosed above are merely intended to help describe the present specification. Not all details of the optional embodiments are described in detail, and the present specification is not limited to the specific embodiment. Clearly, many modifications and changes can be made based on the content of the present specification. In the present specification, these embodiments are selected and specifically described to better explain principles and practical applications of the present specification, so a person skilled in the art can better understand and use the present specification. The present specification is only limited by the claims and all the scope and equivalents thereof

What is claimed is:

1. A computer-implemented method for generating relationship recommendations based on a knowledge graph, comprising:
   determining, by a computing device, parameter entities that comprise event entities associated with node entities;
   constructing, by the computing device, a knowledge graph based on relationships between the parameter entities and predetermined operator entities;
   extracting, by the computing device, a newly added relationship from the knowledge graph based on an inference rule;
   identifying, by the computing device, a training sample data set comprising relationship samples between parameter entity samples and operator entity samples and sample labels corresponding to the relationship samples;
   training, by the computing device, a classification model based on a tree-type model, wherein the classification model associates the relationship samples with the sample labels;
   determining, by the computing device based on the trained classification model, whether a sample label corresponding to the newly added relationship is a white label indicating that the newly added relationship has no fraudulent risk or a black label indicating that the newly added relationship has fraudulent risk;
   in response to determining that the newly added relationship corresponds to the white label, determining, by the computing device, an importance degree of the newly added relationship based on the trained classification model;
   determining, by the computing device, whether the importance degree is greater than a predetermined threshold; and
   in response to determining that the importance degree is greater than the predetermined threshold, adding, by the computing device, the newly added relationship to the knowledge graph.

2. The method according to claim 1, wherein the newly added relationship is a first relationship, and extracting the first relationship from the knowledge graph comprises:
   identifying newly added event entities from the node entities and the event entities based on the inference rule;
   identifying, based on a first condition, operator entities that match the newly added event entities, the node entities, and the event entities;
   determining combined relationships between the newly added event entities, the node entities, the event entities, and the operator entities; and
   extracting the first relationship from the knowledge graph based on the combined relationship.

3. The method according to claim 2, further comprising:
   filtering the combined relationships based on a second condition; and
   extracting a second relationship from the knowledge graph.

4. The method according to claim 1, wherein the tree-type model is an XGBoost model.

5. The method according to claim 1, wherein the inference rule is a path ranking algorithm.

6. The method according to claim 1, wherein the operator entities comprise one or more of a sum operator, an entropy operator, or a gradient operator.

7. A non-transitory, computer-readable medium storing one or more instructions executable by a computer system to perform operations comprising:
   determining, by a computing device, parameter entities that comprise event entities associated with node entities;
   constructing, by the computing device, a knowledge graph based on relationships between the parameter entities and predetermined operator entities;
   extracting, by the computing device, a newly added relationship from the knowledge graph based on an inference rule;
   identifying, by the computing device, a training sample data set comprising relationship samples between parameter entity samples and operator entity samples and sample labels corresponding to the relationship samples;
   training, by the computing device, a classification model based on a tree-type model, wherein the classification model associates the relationship samples with the sample labels;
   determining, by the computing device based on the trained classification model, whether a sample label corresponding to the newly added relationship is a white label indicating that the newly added relationship has no fraudulent risk or a black label indicating that the newly added relationship has fraudulent risk;
   in response to determining that the newly added relationship corresponds to the white label, determining, by the computing device, an importance degree of the newly added relationship based on the trained classification model;
   determining, by the computing device, whether the importance degree is greater than a predetermined threshold; and
   in response to determining that the importance degree is greater than the predetermined threshold, adding, by the computing device, the newly added relationship to the knowledge graph.

8. The non-transitory, computer-readable medium according to claim 7, wherein the newly added relationship is a first relationship, and extracting the first relationship from the knowledge graph comprises:
   identifying newly added event entities from the node entities and the event entities based on the inference rule;
   identifying, based on a first condition, operator entities that match the newly added event entities, the node entities, and the event entities;
   determining combined relationships between the newly added event entities, the node entities, the event entities, and the operator entities; and
   extracting the first relationship from the knowledge graph based on the combined relationship.

9. The non-transitory, computer-readable medium according to claim 8, the operations further comprising:
   filtering the combined relationships based on a second condition; and
   extracting a second relationship from the knowledge graph.

10. The non-transitory, computer-readable medium according to claim 7, wherein the tree-type model is an XGBoost model.

11. The non-transitory, computer-readable medium according to claim 7, wherein the inference rule is a path ranking algorithm.

12. The non-transitory, computer-readable medium according to claim 7, wherein the operator entities comprise one or more of a sum operator, an entropy operator, or a gradient operator.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform operations comprising:
   determining, by a computing device, parameter entities that comprise event entities associated with node entities;
   constructing, by the computing device, a knowledge graph based on relationships between the parameter entities and predetermined operator entities;
   extracting, by the computing device, a newly added relationship from the knowledge graph based on an inference rule;
   identifying, by the computing device, a training sample data set comprising relationship samples between parameter entity samples and operator entity samples and sample labels corresponding to the relationship samples;
   training, by the computing device, a classification model based on a tree-type model, wherein the classification model associates the relationship samples with the sample labels;
   determining, by the computing device based on the trained classification model, whether a sample label corresponding to the newly added relationship is a white label indicating that the newly added relationship has no fraudulent risk or a black label indicating that the newly added relationship has fraudulent risk;
   in response to determining that the newly added relationship corresponds to the white label, determining, by the computing device, an importance degree of the newly added relationship based on the trained classification model;
   determining, by the computing device, whether the importance degree is greater than a predetermined threshold; and
   in response to determining that the importance degree is greater than the predetermined threshold, adding, by the computing device, the newly added relationship to the knowledge graph.

14. The system according to claim 13, wherein the newly added relationship is a first relationship, and extracting the first relationship from the knowledge graph comprises:
   identifying newly added event entities from the node entities and the event entities based on the inference rule;
   identifying, based on a first condition, operator entities that match the newly added event entities, the node entities, and the event entities;
   determining combined relationships between the newly added event entities, the node entities, the event entities, and the operator entities; and
   extracting the first relationship from the knowledge graph based on the combined relationship.

15. The system according to claim 14, the operations further comprising:
   filtering the combined relationships based on a second condition; and
   extracting a second relationship from the knowledge graph.

16. The system according to claim 13, wherein the tree-type model is an XGBoost model.

17. The system according to claim 13, wherein the inference rule is a path ranking algorithm.

18. The system according to claim 13, wherein the operator entities comprise one or more of a sum operator, an entropy operator, or a gradient operator.

* * * * *